US010616166B1

(12) United States Patent
Cordell et al.

(10) Patent No.: US 10,616,166 B1
(45) Date of Patent: *Apr. 7, 2020

(54) METHOD AND APPARATUS OF PROVIDING LIVE SUPPORT SERVICE IN A NOTIFICATION SYSTEM

(71) Applicant: West Corporation, Omaha, NE (US)

(72) Inventors: Jeffrey William Cordell, Omaha, NE (US); James K. Boutcher, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,504

(22) Filed: Feb. 5, 2019

Related U.S. Application Data

(63) Continuation of application No. 15/437,849, filed on Feb. 21, 2017, now Pat. No. 10,200,334, which is a
(Continued)

(51) Int. Cl.
*H04L 12/58* (2006.01)
*G06Q 30/00* (2012.01)
(Continued)

(52) U.S. Cl.
CPC .......... *H04L 51/24* (2013.01); *G06Q 10/107* (2013.01); *G06Q 30/01* (2013.01); *G06Q 30/016* (2013.01); *H04L 51/10* (2013.01); *H04L 51/36* (2013.01); *H04L 51/38* (2013.01); *H04L 67/26* (2013.01); *H04L 67/306* (2013.01); *H04W 4/14* (2013.01)

(58) Field of Classification Search
CPC ......... H04L 51/32; H04L 51/10; H04L 51/24; H04L 51/36; H04L 67/26; H04L 51/04; H04L 51/08; G06Q 50/01; G06Q 30/016; G06Q 30/0269; G06Q 10/10; G06Q 50/24; G06Q 10/1095; H04M 3/5175; H04M 3/42042; H04M 3/493; H04M 3/51; H04M 3/5183; H04M 2201/50; H04M 2203/652; H04W 4/14; G06F 19/3418; G06F 19/30; G06F 19/3462; G06F 19/3468; H04N 7/141; E04H 3/08; G16H 10/60; Y02A 90/26
See application file for complete search history.

(56) References Cited

U.S. PATENT DOCUMENTS 6,856,240 B1 * 2/2005 Elswick .............. H04W 84/022
340/7.22
7,581,230 B2 * 8/2009 Chen ..................... G06Q 10/06
719/328
(Continued)

*Primary Examiner* — Sargon N Nano

(57) ABSTRACT

A method and apparatus of providing notifications to a customer is disclosed. One example method of operation may include identifying a notification event associated with a customer via a customer management module and retrieving a customer preference record and determining a notification device preference for a customer Internet protocol (IP) device included in the customer preference record. The method may also include transmitting the notification event to the customer's IP device based on the notification device preference, the notification event may include a live agent support option which may be accessed in the event that the automated support options fail to satisfy the customer's questions and concerns.

17 Claims, 7 Drawing Sheets

Related U.S. Application Data continuation of application No. 15/019,049, filed on Feb. 9, 2016, now Pat. No. 9,577,973, which is a continuation of application No. 14/174,584, filed on Feb. 6, 2014, now Pat. No. 9,256,879, which is a continuation of application No. 13/279,572, filed on Oct. 24, 2011, now Pat. No. 8,667,072.

(51) Int. Cl.
*H04W 4/14* (2009.01)
*H04L 29/08* (2006.01)
*G06Q 10/10* (2012.01)

(56) References Cited

U.S. PATENT DOCUMENTS

| | | | | |
|---|---|---|---|---|
| 8,024,438 B2 * | 9/2011 | Bedingfield, Sr. | ............................ | H04L 41/0896 709/223 |
| 8,271,336 B2 * | 9/2012 | Mikurak | ............... | G06Q 10/087 705/22 |
| 9,036,807 B1 * | 5/2015 | Tuchman | ................ | H04W 4/21 379/265.09 |
| 9,245,287 B2 * | 1/2016 | Gechter | ................. | G06Q 30/06 |
| 10,218,651 B2 * | 2/2019 | Schubert | ................ | H04L 51/046 |
| 2009/0051765 A1 * | 2/2009 | Moberly | ............. | G06F 19/3418 348/77 |
| 2010/0135472 A1 * | 6/2010 | Watanabe | ................ | H04M 3/50 379/88.08 |
| 2010/0188230 A1 * | 7/2010 | Lindsay | ................ | G06Q 50/22 340/573.1 |
| 2010/0332522 A1 * | 12/2010 | Steidley | .................. | H04W 8/20 707/769 |
| 2011/0050428 A1 * | 3/2011 | Istoc | ...................... | G16H 50/20 340/573.1 |
| 2011/0141919 A1 * | 6/2011 | Singh | .................. | H04L 41/0681 370/252 |
| 2012/0109679 A1 * | 5/2012 | Massoumi | ........... | G06Q 10/109 705/2 |
| 2013/0173687 A1 * | 7/2013 | Tuchman | ........... | G06Q 30/0601 709/202 |
| 2013/0325726 A1 * | 12/2013 | Tuchman | ............... | H04L 63/104 705/304 |
| 2014/0022328 A1 * | 1/2014 | Gechter | ................. | G06Q 30/06 348/14.02 |
| 2015/0117631 A1 * | 4/2015 | Tuchman | ................ | H04W 4/21 379/265.09 |
| 2016/0044174 A1 * | 2/2016 | Tuchman | ........... | G06Q 30/0601 379/265.12 |

* cited by examiner

METHOD AND APPARATUS OF PROVIDING LIVE SUPPORT SERVICE IN A NOTIFICATION SYSTEM

CROSS-REFERENCE TO RELATED APPLICATIONS

This application is a continuation from U.S. patent application Ser. No. 15/437,849, filed Feb. 21, 2017 and entitled "METHOD AND APPARATUS OF PROVIDING LIVE SUPPORT SERVICE IN A NOTIFICATION SYSTEM", which is a continuation from U.S. patent application Ser. No. 15/019,049, filed Feb. 9, 2016, and entitled "METHOD AND APPARATUS OF PROVIDING LIVE SUPPORT SERVICE IN A NOTIFICATION SYSTEM", now issued U.S. Pat. No. 9,577,973, which is a continuation from U.S. patent application Ser. No. 14/174,584, filed Feb. 6, 2014, and entitled "METHOD AND APPARATUS OF PROVIDING LIVE SUPPORT SERVICE IN A NOTIFICATION SYSTEM", now issued U.S. Pat. No. 9,256,879, which is a continuation from U.S. patent application Ser. No. 13/279,572, filed Oct. 24, 2011, and entitled "METHOD AND APPARATUS OF PROVIDING LIVE SUPPORT SERVICE IN A NOTIFICATION SYSTEM", now issued U.S. Pat. No. 8,667,072, each of which is incorporated by reference herein in its entirety.

TECHNICAL FIELD OF THE INVENTION

This invention relates to a method and apparatus of providing notifications to a customer, and, more particularly, to providing live support via a bridging application in response to a customer request response to a notification.

BACKGROUND OF THE INVENTION

Consumers seek to maximize the use of their time. Electronic devices such as personal digital assistants (PDAs) mobile telephones and other Internet connectivity devices ("mobile stations") provide users with mobile access to information resources. Other common services provided to users include subscription data services, such as cable television, high-speed Internet services and digital telephone services.

Digital services, such as voice services, mobile data services, and television content services provide integrated data services to the end user. In addition to the increased availability of a mobile station, certain communication protocols and communication procedures are becoming increasingly popular and easy to implement, such as, text messaging, which may use short messaging service (SMS), multimedia messaging service (MMS), instant messaging (IM) and/or any other free format text application.

Conventionally, users relied strictly on calendar applications integrated with e-mail and their mobile devices. However, since users may be engaged with any of the above-noted services at any given time, all of these services may provide notifications or reminders to the user to maintain an interactive environment customized to the users needs and preferences.

SUMMARY OF THE INVENTION

One embodiment of the present invention may include a method that includes identifying a notification event associated with a customer via a customer management module and retrieving a customer preference record and determining a notification device preference for a customer Internet protocol (IP) device included in the customer preference record. The method may also include transmitting the notification event to the customer's IP device based on the notification device preference, the notification event including a live agent support option Another example embodiment of the present invention may include an apparatus including a processor configured to identify a notification event associated with a customer via a customer management module and retrieve a customer preference record, and determine a notification device preference for a customer Internet protocol (IP) device included in the customer preference record. The apparatus may also include a transmitter configured to transmit the notification event to the customer's IP device based on the notification device preference, the notification event including a live agent support option.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
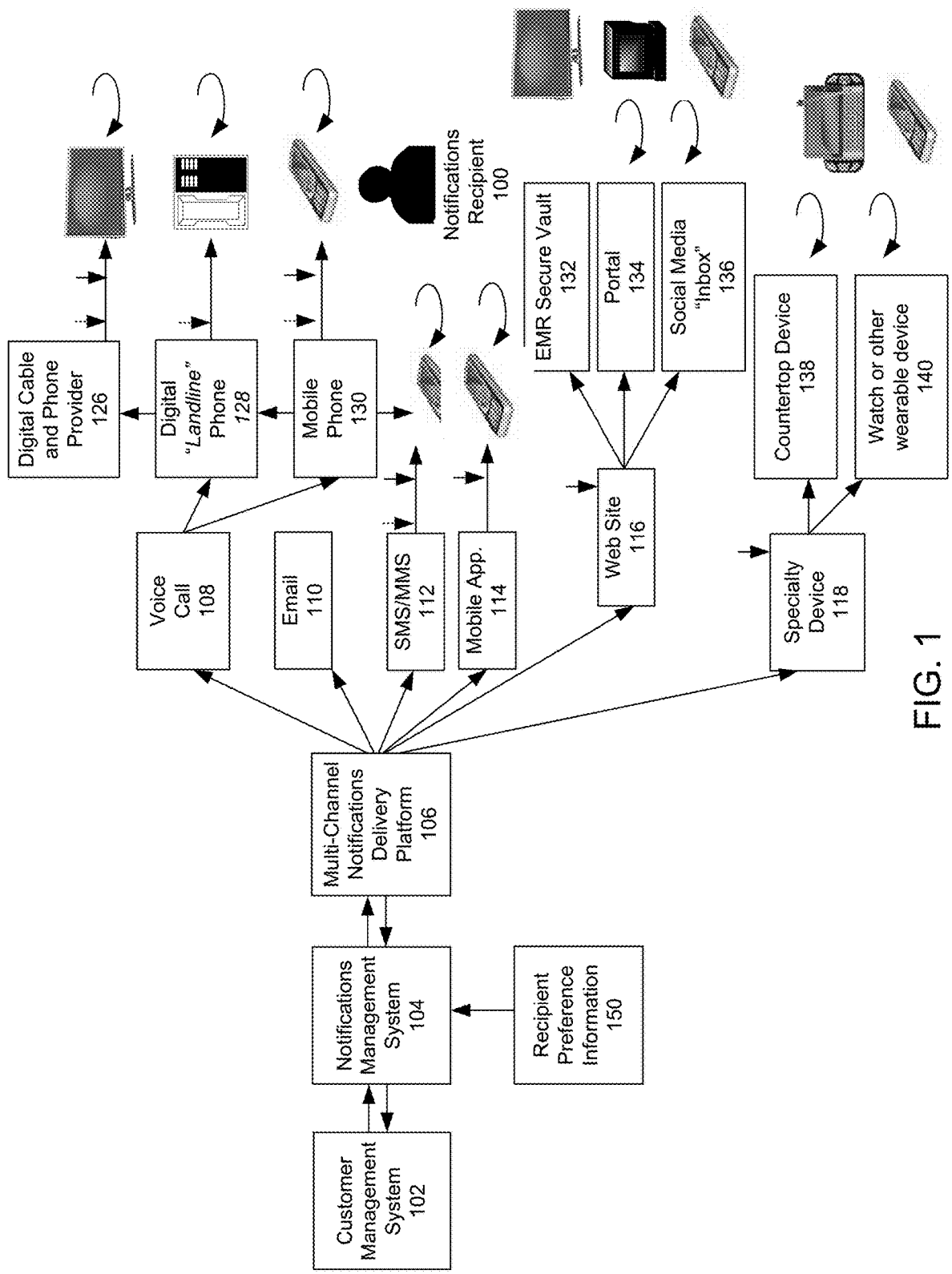
FIG. 1 illustrates an example logic diagram of a communication network system according to example embodiments.

FIG. 1 illustrates an example logic diagram of a communication network system according to example embodiments of the present invention. Referring to FIG. 1, an end user notifications recipient 100 may be operating a mobile station or mobile phone 130. The recipient may also be operating a television 126, landline phone 128, computer device portal 134, specialty device 118, such as a countertop or tablet device 138 and/or a watch or wearable device 140. Any or more of these communication devices may be communicating wirelessly with a communications network, which may be the Internet 124, a private network and/or a mobile telephony network.

In operation, the communication network of FIG. 1 processes notifications, which are sent to the end user 100 at the appropriate time(s). The notifications may be sent as a voice call 108, email 110, SMS/MMS message 112, mobile application 114 (e.g., mobile smartphone application), or a web site update 116 or related link. The website 116 provides an electronic medial record EMR secure vault 132, a portal 134 and/or a social media inbox 136. For example, a text message may be sent as a notification across a cellular or wireless communication network to a remote application server. Certain text messaging protocols may be used, such as, mobile short message service (SMS), multimedia message service (MMS), and instant messaging (IM), or any other related text application. The communication link may include transferring information over communication links, such as wireless networks (e.g., GSM, CDMA, 3G, 4G, etc.), wireline networks (e.g., landline telephony), Internet, satellite/cable networks, or any other data medium using standard communication protocols.

Customer management system (CMS) 102, notifications management system (NMS) 104 and multi-channel notifications delivery platform (MC-NDP) 106 operate together to manage customer records, notifications and preferred user delivery options. For example, the CMS 102 may operate by maintaining a customer application which manages reminders, notifications, preferences and scheduled delivery times based on various parameters. For example, the CMS 102 provides an application that will keep time records and execute customer notifications at the appropriately scheduled times. Customer records may be maintained via a customer record database that stores user profile information, EMR data and related user information. The notification may be transferred to the customer as a video, audio, multi-media and/or text message format.

In operation, when a customer is setup to receive a notification, the CMS 102 will retrieve the customer record from the customer database. The customer may have a time sensitive notification setup to be delivered to the customer at a scheduled time. The information associated with the notification may be cross-referenced to ensure the customer or notifications recipient 100 receives all of the necessary information needed and at the appropriate time(s). The NMS 104 may then prepare the notification for delivery based on customer specific preferences. For instance, the user may specify delivery preferences via his or her mobile phone 130 by text message, digital cable TV 126 by message display and/or by additional communication devices. The NMS 104 may retrieve the user preferences from a record or file stored in a recipient preference information (RPI) data store 150.

The NMS 104 may receive the notification data from the CMS 102 and retrieve user preferences for customizing the notification delivery. Next, the delivery platform 106 may receive a forwarded message indicating the notification and the corresponding user preferences. The user preferences stored in the RPI data store 150 may be predetermined preferences that are setup when a customer fills-out paper work or electronic forms at an initial doctor appointment, for an insurance company, etc., which are linked to the customer's EMR records. At this point, the user may have specified how he or she desires to be contacted and how they desire to provide feedback regarding certain health related notifications.

The delivery platform 106 may communicate with all various different communication platforms, such as cellular, Internet, PSTN, etc. The customer preferences may be used to select one or more communication mediums or channels for providing the notification to the user. Once the user preferences have been identified by the delivery platform 106, the notification message may be transmitted to the customer recipient 100 via his or her preferred communication device.

Figure 2:
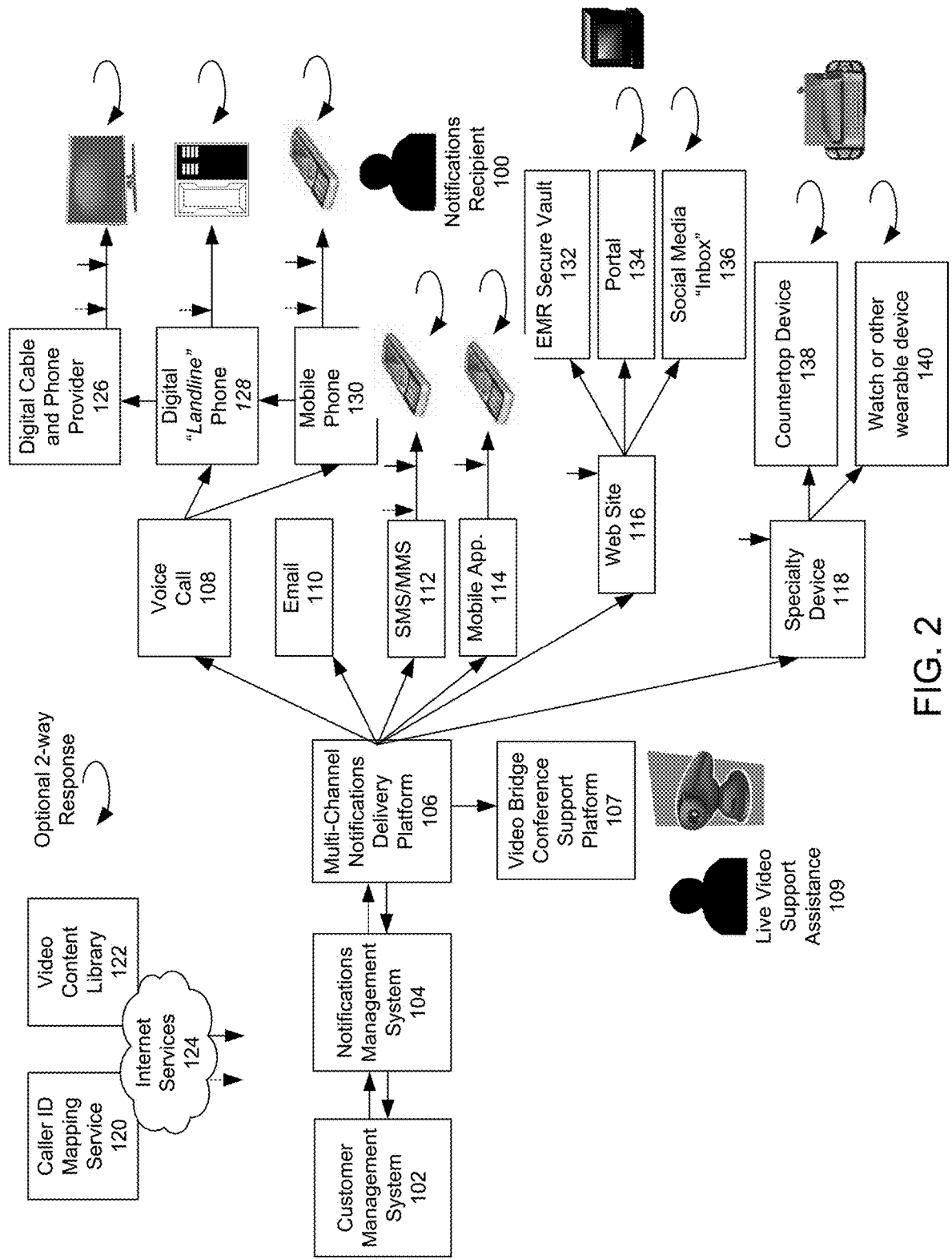
FIG. 2 illustrates a logic diagram of a content delivery and feedback system including the bridging live agent option according to example embodiments.

FIG. 2 illustrates a logic diagram of a content delivery and feedback system according to example embodiments of the present invention. Referring to FIG. 2, like references and numerals refer to like components illustrated throughout the disclosure. As may be observed, a caller ID mapping service 120 and video content library 122 may be used during the notification and feedback procedure. For instance, the caller ID mapping service 120 may map the notification data to a service provider or entity name which is displayed on the user device (see FIG. 3). This provides the customer with instant knowledge of who is trying to notify the customer and for what purpose.

In FIG. 2, the customer recipient 100 has received notification data via his or her mobile phone 130 from a voice call platform 108. The customer 100 may have specified ahead of time that the contact preference is by a voice call 108 type of notification, which will attempt to call the customer's phone number for a home phone (not shown), mobile phone 130 or both. Once a notification is communicated to the customer, feedback may be required in order to ensure the safe delivery of the notification and to indemnify the notification service that active measures were taken and the customer confirmed that the message was received. For instance, a user may submit a response by dialing a number on his or her phone (DTMF), returning an email, selecting a web link, returning a text message, selecting a button on his or television remote control, etc. Alternatively, the customer may elect to respond by asking for additional information. For instance, the customer 100 may ask for additional information regarding the content of the notification by accessing the video content library 122 to retrieve a video that is related to the notification to educate the customer about the purpose of the notification and answer certain frequently asked questions (FAQs). For example, if the customer has a scheduled procedure (i.e., colonoscopy, vasectomy, etc.), the customer may be reminded to stop eating, take a pill, etc. The customer in turn may be nervous or concerned and may want to obtain additional information. The information may be forwarded to the customer as an informational video that answers the majority of FAQs asked by customers for that particular topic area.

In another example with reference to FIG. 2, the customer 100 may receive a video related to the notification event and still require additional support. If the user receives a notification, watches a subsequent video and still needs additional support the system may automatically bridge a live agent 109 for support. For example, the customer may finish watching the video and receive a prompt to confirm that the video was helpful and their questions have been answered, or, that the video did not answer all of the customer's questions and that additional support is requested. In this case, the video conference bridge support platform may be invoked to connect a conference camera/microphone/audio device and connect the live agent 109 with the customer 100 to answer the additional questions.

Figure 3:
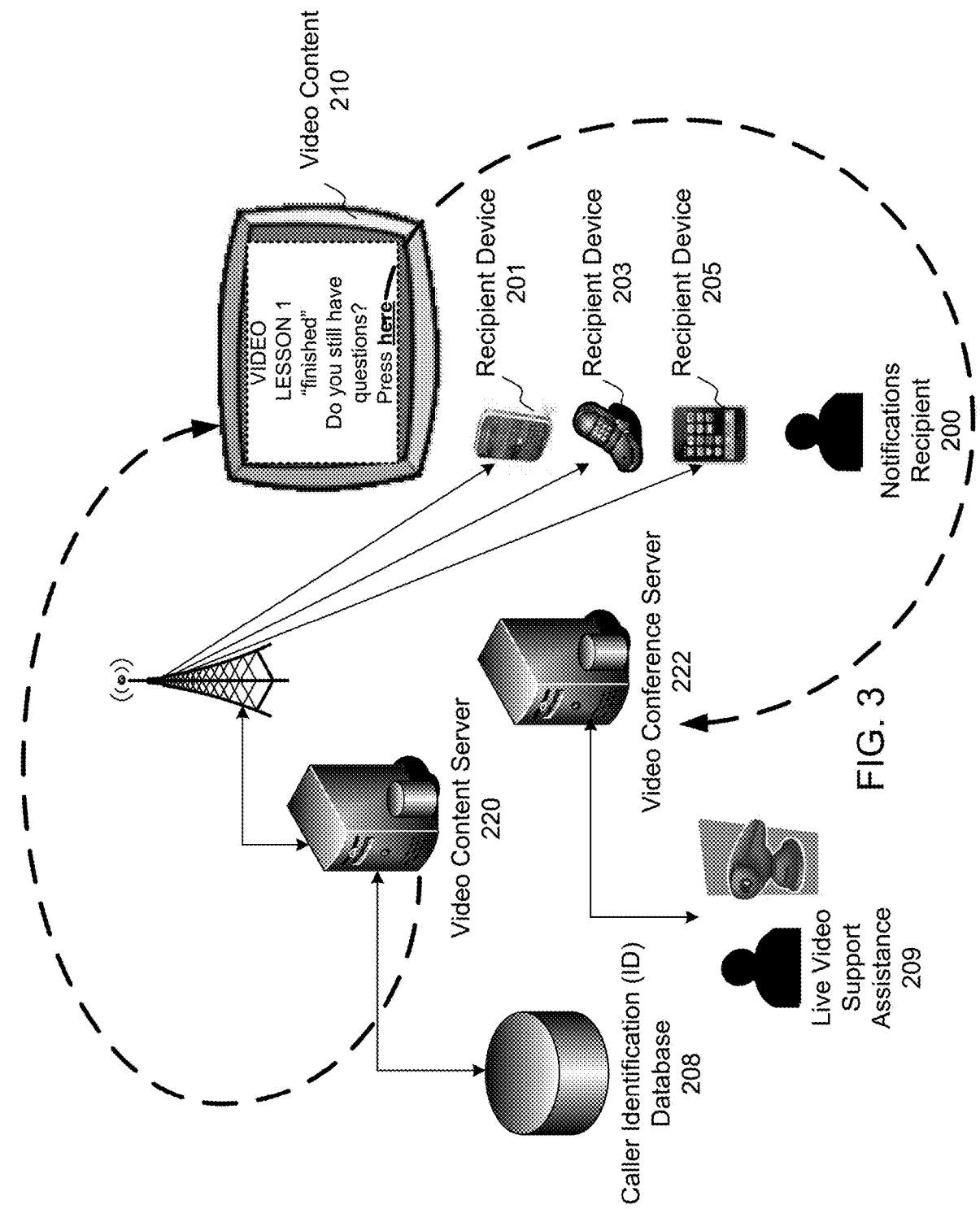
FIG. 3 illustrates an example instruction video delivery notification system and subsequent customer live agent support session according to example embodiments.

FIG. 3 illustrates an example mobile device notification system according to example embodiments. Referring to FIG. 3, a customer 200 may be operating any of the example recipient devices 201 (data interface phone), 203 (cellular phone) and 205 (smartphone). The customer 200 may be setup to receive voice reminders which are communicated to their recipient device 201-205. In the case of a smartphone 205, a notification application may be separate and linked to video presentation options and calendar options to ensure that the notifications are received and that additional smartphone options, such as video players and calendar functions, etc., are cross-correlated with the notification application. In addition to calendar functions, example embodiments may provide notifications for other similar customer procedures, customer reminders, events (e.g., prescription ready reminders, travel alerts, weather alerts, outage notifications, etc.).

Upon receiving a request for a video, the video content server 220 may reference a caller identification database 208 to obtain the information necessary to correlate the video content, the customer 200 and the notification entity (medical insurance company, health care provider, etc.). The video may then be sent to the customer 200 for informational purposes. The video content server 220 may transmit a pre-recorded video to the user to educate him about the vasectomy procedure and related information. Additional options presented to the customer 200 may include setting-up another appointment at the doctor's office, requesting a phone call from the doctor's office or even requesting emergency services. Given the severity of the customer's profile or medicinal regiment, emergency medical services may be automatically called on behalf of the customer if the user does not respond with a certain amount of time.

A customer 200 may receive the initial notification and receive an option to request additional information, such as video content and related instructions. The video content 210 may be received with various options presented on a smartphone messaging application or media player application. Once the video is completed, the user may still have additional questions and a prompt to select "Here" may be presented to offer the customer a chance to connect with a live agent 209. The previous video session of the video content server 220 may be discontinued and a bridging operation may be performed to dial a live agent 209 and offer audio, video, chat or a combination of all three types of communication channels during a live communication session between the live agent 209 and the customer 200.

Figure 4:
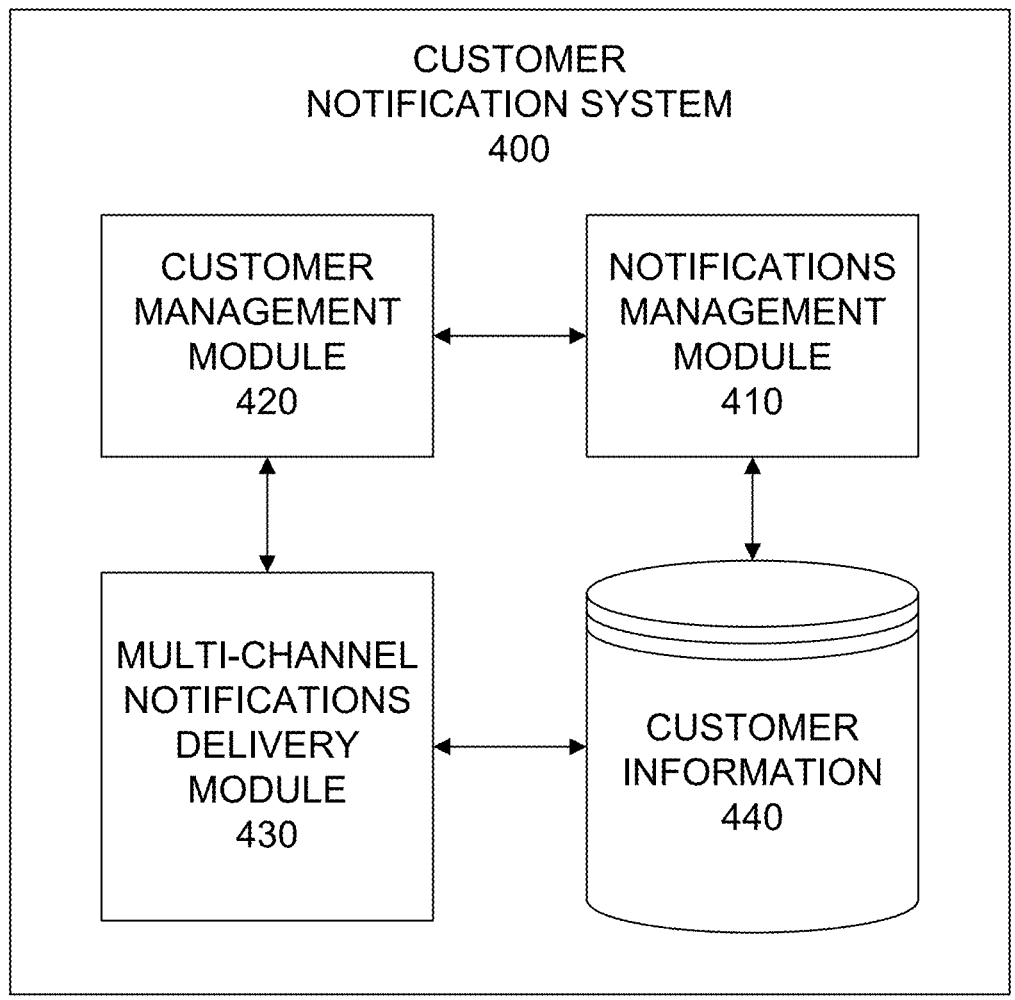
FIG. 4 illustrates an example customer notification system according to example embodiments.

FIG. 4 illustrates an example customer notification system according to example embodiments. Referring to FIG. 4, in order to deliver notifications to customers, the customer management system or device(s) is configured to identify a notification event associated with a customer. The notification event may be identified by a customer management system device by accessing a database and retrieving a notification event file used to store notification events for all customers. When delivering notifications to customers, the customer management system or device may be configured for identifying a notification event associated with a particular customer. The notification event may be identified by a customer management system device by accessing a database and retrieving a notification event file used to store notification events for all customers.

Customer notification system 400 includes a customer information database 440, a notifications management module 410, a customer management module 420 and a multi-channel notifications delivery module 430. Each of the modules or engines may be part of one computer-based processing device, such as a computer or server configured to perform processing and notification delivery operations. The customer notification system may also include more than one device in communication over a network communication system.

One example of the operation of the notification system 400 may include identifying a notification event associated with a customer via a customer management module 420 and retrieving a customer record from a customer information database 440. The operation of the system 400 may also include identifying a customer's IP-based device via a device preference indicating the IP device in the customer preference record via a notification management module 410. The notification event may be transmitted to the customer's mobile device based on the voice channel preference(s) of the customer and the multi-channel notifications delivery module 430, which selects the particular channel used to contact the customer.

Continuing with the same example, the system 400 may forward the identified notification event to the notification management module 410, which retrieves the customer preference record and creates a delivery setup configuration used to initiate communication with the customer. The notification event may be one or more of a doctor appointment, medical procedure, a recurring reminder ("take your pill") and an educational data segment ("preparation for a vasectomy"). The customer's preference record may include at least one of a communication device type preference (IP device, telephone, mobile phone, etc.) and a message type preference (voice call vs. text message, vs. e-mail, etc.). Contacting the customer may also include transmitting an alert to the customer's IP device via a voice call platform and retrieving a caller identification (ID) from a caller ID database.

The customer may also be provided with an option to receive a video message based on the retrieved caller ID information indicating the user's identification information, the video content information, the notification manager information, etc. The video that is transmitted to the customer may be wholly or partially based on content of the notification event (vasectomy reminder=vasectomy preparation video). The customer may confirm that the video was received, observed and/or understood. The system 400 may receive a confirmation message from the customer that the video message was received.

The customer may be identified or located by an IP device presence procedure conducted by the system 400. For example, once the notification event is invoked and the customer is identified, the customer may be currently operating one or more IP-based devices. The customer may be logged-in to a particular account, such as an e-mail account, application account etc., which issues the customer a unique account number or IP address and which may store additional customer information such as username, password, hardware address, GPS location, etc. The customized customer account information may be used for determining a current presence status of the customer Internet protocol (IP) device(s). As a result, the customer may be identified by his or her IP presence status (e.g., logged-in, logged-out, GPS location updates, recent messages transfers, etc.). Once located and identified, the customer's IP device may be contacted by transmitting an alert notification to the customer's IP device via a push notification protocol.

The notification(s) may be stored in the notifications management module 410 which is configured to store data files corresponding to notification types, dates, customers and corresponding to various different business clients subscribed to have such notification services delivered to their respective clients. When a notification is scheduled to be delivered to a particular customer, the customer information database 440 may provide information regarding the customer's personal status, contact preferences and other customer-specific information stored in an EMR record database file or files (e.g., name, condition, age, health status (severe, stable, healthy) etc.). The notification may trigger the retrieval of a customer preference record identifying the customer's contact preferences. The customer's contact preferences may be retrieved from the customer's record in the customer information database 440 and forwarded to the multi-channel notifications delivery module 430 for delivery medium selection purposes. The system 400 may perform contacting the customer and providing the notification event to the customer based on at least one of the customer's contact preferences (e.g., cell phone, home phone, push e-mail, text message, voice mail, etc.).

The notification event may require one or more notifications and one or more forms of feedback to ensure that the content of the notification has been properly relayed to the customer. One notification event may include multiple different portions of information that must be communicated to a customer. The notification event may also require various different feedback responses after transmitting the notifications to the customer. The notification event may be forwarded to a notifications management module 410 which retrieves the customer preference record and creates a delivery setup configuration used to initiate communication with the customer. Examples of notification events include a doctor appointment, medical procedure, a recurring reminder (i.e., message—"take your pill at 8 am!") and an educational data segment (i.e., voice mail, video, text message, audio message, etc.). The data segment may include a message, such as a pill taking procedure informing the customer to not eat before and after taking the pill, and not taking more than one pill at a time, etc.

The customer's contact preferences may include a specific communication device type preference and a message type preference (e.g., cell phone and text message). Contacting the customer may further include selecting a delivery medium based on the customer's contact preferences via the multi-channel notification and delivery module 430, and delivering the notification to the customer communication device via the customer's preferred contact preferences. Once the customer has received the notification, the customer may respond to a request for feedback (i.e., "did you understand the message"). The notification system 400 may receive a confirmation message from the customer communication device that the notification was acknowledged. The notification system 400 may also receive a request from the customer communication device for additional information associated with the received notification. In response, the notification system 400 may perform transmitting text data, audio data, video data to the customer communication device (i.e., cell phone, TV, home phone, etc.) responsive to receiving the request from the customer communication device.

In another example, the customer may receive an educational data segment or video and still have outstanding questions about an upcoming appointment or medical procedure that needs to be addressed prior to the appointment date. In this case, the customer may be prompted with an option to receive additional support from a live agent. The customer may elect to communicate with the live agent in which case the system 400 may setup a bridging application to connect with the live agent via voice, video and/or chat communication options. The live agent may then address the customer's concerns.

The live agent support option may further be integrated with the timeline of the video content for more accurate response options. For example, the customer may select the live agent help during a particular segment of the video. In this case, the timeline of the video may be cross-correlated with a specific sub-topic area of the video during such portion of the video's timeline when the customer requested help. This video content timeline information may be stored in a separate video timeline file that identifies or guesses the customer's question based on the moment during the video that the live support was requested. This also provides routing options to route the live agent support to an agent qualified to answer such a specific sub-topic related question. Furthermore, the sub-topic cross-correlation procedure may yield additional automated support (e.g., additional text information related to the specific video timeline request initiated by the customer) prior to bridging the customer with the live agent support.

Figure 5A:
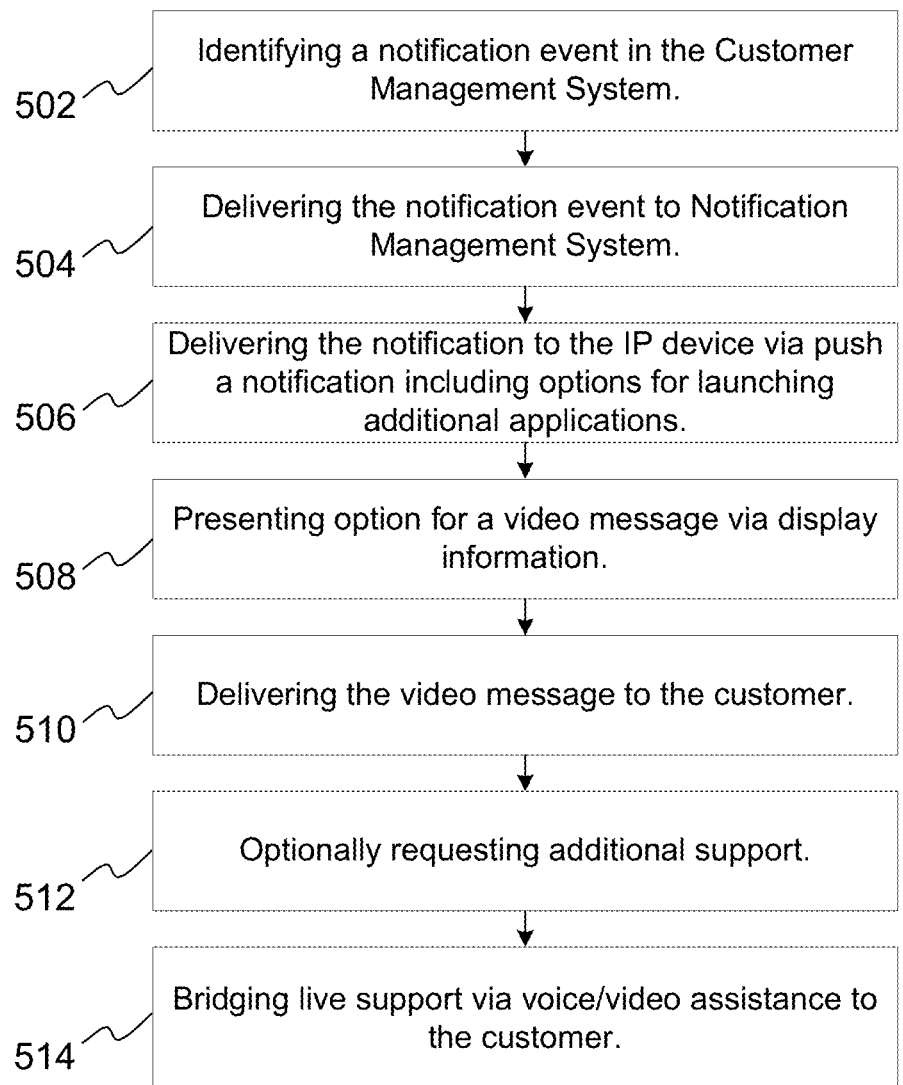
FIG. 5A illustrates a flow diagram of an example method according to example embodiments.

FIG. 5A illustrates a flow diagram of an example method of operation according to example embodiments of the present invention. Referring to FIG. 5A, the system may identify a notification event stored in the customer management system based on a time elapsed trigger or other event which invokes the notification event to mature into a live notification event 502. The system may deliver the notification event to the NMS to setup the notification communication procedure 504. The alert type or preference associated with the target customer may be identified based on predetermined contact preferences, such as an IP device preference, and according to one example the "IP device presence" may be used as a communication choice preference for the target customer and the system may determine the presence of the customer's mobile device based on the IP device presence. Other customer contact preferences may specify a set-top-box device, cell phone, smartphone, e-mail account address, text message, home phone, voice mail, etc.

Continuing with the sample notification example, the customer's IP device may be alerted by a push notification 506. The alert or notification may then be provided to the customer with an option for receiving a corresponding video based on the content of the notification event 508. The customer may elect to receive the video and the video may be received by the customer 510. The customer may provide feedback that the video was received and/or understood and the feedback response may be delivered to the NMS. The customer may elect to have additional support after the video was confirmed 512. The system may then bridge a connection to a live agent to provide interactive support to the customer via a bridging application 514.

Figure 5B:
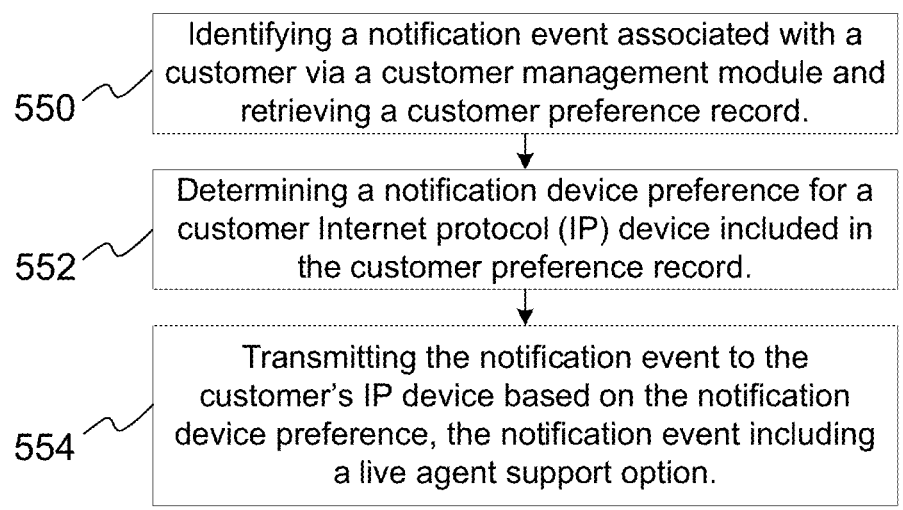
FIG. 5B illustrates a flow diagram of another example method according to example embodiments.

FIG. 5B illustrates another flow diagram of another example method according to example embodiments of the present invention. Referring to FIG. 5B, the method may include identifying a notification event associated with a customer via a customer management module and retrieving a customer preference record 550 and determining a notification device preference for a customer Internet protocol (IP) device included in the customer preference record 552. The method may also include transmitting the notification event to the customer's IP device based on the notification device preference, the notification event including a live agent support option 554.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of FIGS. 1-3.

Figure 6:
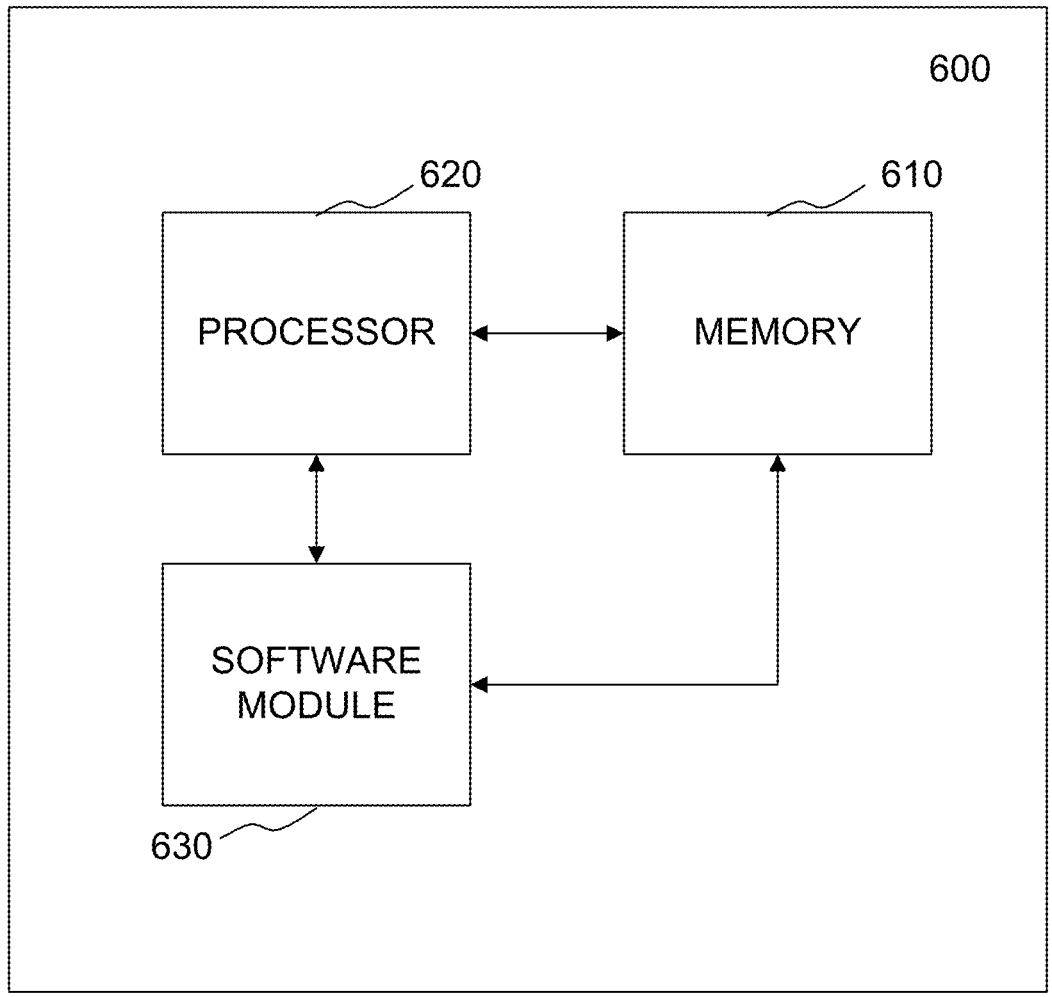
FIG. 6 illustrates a network entity that may include memory, software code and other computer processing hardware, according to example embodiments.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising: transmitting a notification of an event to a device associated with a customer based on a notification device preference of the device and based on a content of the notification, the notification including a live agent support option to select support by a live agent and a video message option to select a video explaining a purpose of the notification and providing information regarding the notification;
receiving a selection by the customer requesting a video message; receiving, after the selection requesting the video message, a selection by the customer requesting live agent support;
selecting a particular agent to provide live agent support based on an identification of a particular segment of the video message that is playing when the customer requests live agent support; and connecting the device to the particular agent.

2. The method of claim 1, further comprising—forwarding the notification to a notification management module that retrieves a customer preference record and creates a delivery setup configuration used to initiate communication with the customer.

3. The method of claim 2, wherein the customer preference record comprises a communication device type preference and a message type preference.

4. The method of claim 3, further comprising: contacting the customer by further comprises transmitting a plurality of options to the device via a push notification protocol, the plurality of options comprising at least one of a message access option, a calendar application updating option, and a rescheduling option.

5. The method of claim 1, wherein the event is a least one of a doctor appointment, a medical procedure, a recurring reminder, and an educational data segment transmitted as at least one of a video, an audio message, a multi-media message, and a text message.

6. The method of claim 1, wherein the selection by the customer requesting a video message confirms receipt of the notification event.

7. An apparatus, comprising:
a processor; and
a transmitter configured to;
transmit a notification of an event to a device associated with a customer based on a notification device preference and based on a content of the notification, wherein the notification includes a live agent support option to select support by a live agent and a video message option to select a video explaining purpose of the notification event and providing information regarding the notification event wherein the processor is further configured to:
receive a selection by the customer requesting a video message;
receive, after the selection requesting the video message, a selection by the customer requesting live agent support;
selecting a particular agent to provide live agent support based on an identification of a particular segment of the video message that is playing when the customer requests live agent support; and connect the device to the particular agent.

8. The apparatus of claim 7, wherein the processor is further configured to forward the notification to a notification management module that retrieves a customer preference record and creates a delivery setup configuration used to initiate communication with the customer.

9. The apparatus of claim 8, wherein the customer preference record comprises a communication device type preference and a message type preference.

10. The apparatus of claim 9, wherein the transmitter is further configured to:
transmit a plurality of options to the device via a push notification protocol, the plurality of options comprising:
at least one of a message access option, a calendar application update option, and an option to reschedule.

11. The apparatus of claim 7, wherein the event is a least one of a doctor appointment, a medical procedure, a recurring reminder, and an educational data segment transmitted as at least one of a video, an audio message, a multi-media message, and a text message.

12. The apparatus of claim 7, further comprising a receiver configured to receive a response from the device requesting the information, wherein the response from the device confirms receipt of the notification event.

13. A non-transitory computer readable storage medium configured to store instructions that when executed by a processor cause the processor to perform:
   transmitting a notification of an event to a device associated with a customer based on a notification preference of the device and based on a content of the notification t, the notification including a live agent support option to select support by a live agent and a video message option to select a video explaining a purpose of the notification and providing information regarding the notification;
   receiving a selection by the customer requesting a video message;
   receiving, after the selection requesting the video message, a selection by the customer requesting live agent support;
   selecting a particular agent to provide live agent support based on an identification of a particular segment of the video message that is playing when the customer requests live agent support; and connecting the device to the particular agent.

14. The non-transitory computer readable storage medium of claim 13, further configured to store instructions that when executed by the processor cause the processor to perform forwarding the notification to a notification management module that retrieves a customer preference record and creates a delivery setup configuration used to initiate communication with the customer.

15. The non-transitory computer readable storage medium of claim 14, wherein the customer's preference record comprises a communication device type preference and a message type preference.

16. The non-transitory computer readable storage medium of claim 15, further configured to store instructions that when executed by the processor cause the processor to perform:
   contacting the customer by transmitting a plurality of options to the device via a push notification protocol the plurality of options comprising at least one of a message access option, a calendar application updating option, and a rescheduling option.

17. The non-transitory computer readable storage medium of claim 13, wherein the event is a least one of a doctor appointment, a medical procedure, a recurring reminder, and an educational data segment transmitted as at least one of a video, an audio message, a multi-media message, and a text message.

* * * * *